April 14, 1936. M. H. LOUGHRIDGE 2,037,034
BRAKING SYSTEM
Filed May 31, 1930  2 Sheets-Sheet 1

Fig.2ª

INVENTOR.
M H Loughridge

April 14, 1936.  M. H. LOUGHRIDGE  2,037,034
BRAKING SYSTEM
Filed May 31, 1930  2 Sheets-Sheet 2
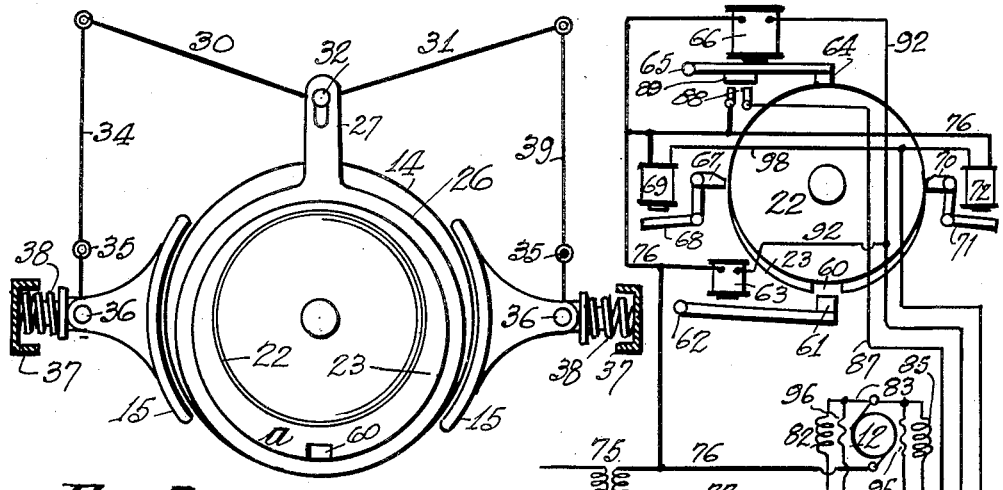
Fig. 3
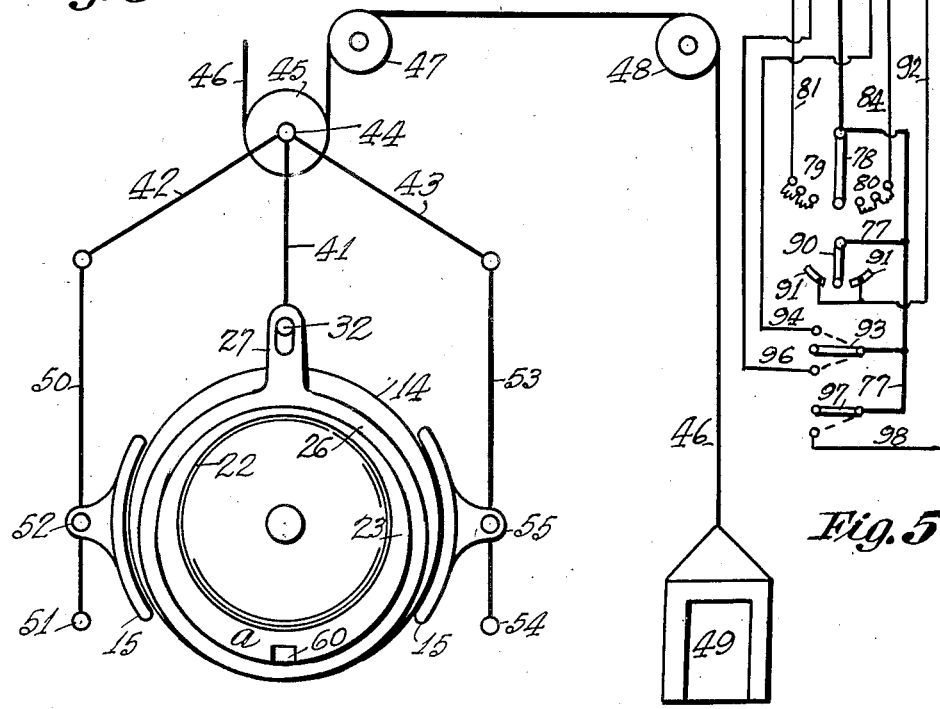
Fig. 4
Fig. 5
INVENTOR.
M. H. Loughridge Patented Apr. 14, 1936

2,037,034

UNITED STATES PATENT OFFICE 2,037,034

BRAKING SYSTEM

Matthew H. Loughridge, Bogota, N. J.

Application May 31, 1930, Serial No. 458,736

43 Claims. (Cl. 187—29)

This invention relates to a braking system and admits of general application in this art and has for an object to provide a braking system in which a pair of brake shoes engage a rotating member and are operated by a toggle mechanism; another object of the invention is to provide a braking system which is operated by the driving motor; another object of the invention is to provide a braking system controlled by the driving motor in which the degree of braking may be varied; another object of the invention is to provide a braking system which is operated by the load; another object of the invention is to provide a braking system on the closed circuit plan, that is, so that the failure of any essential part will lead to a braking effect. Other objects of this invention will be more clearly understood from the following specification and the accompanying drawings, in which, Fig. 1 is a plan view of a hoisting mechanism constructed according to this invention;

Fig. 2a is a sectional view of the differential mechanism;

Fig. 3 is a diagram showing the operation of the toggle mechanism controlling the brake shoes;

Fig. 4 is a diagram showing the application of the braking system to an elevator in which the braking force is supplied by the load on the cables, and Fig. 5 is a diagram of the operating circuits for controlling the system.

Figure 1:
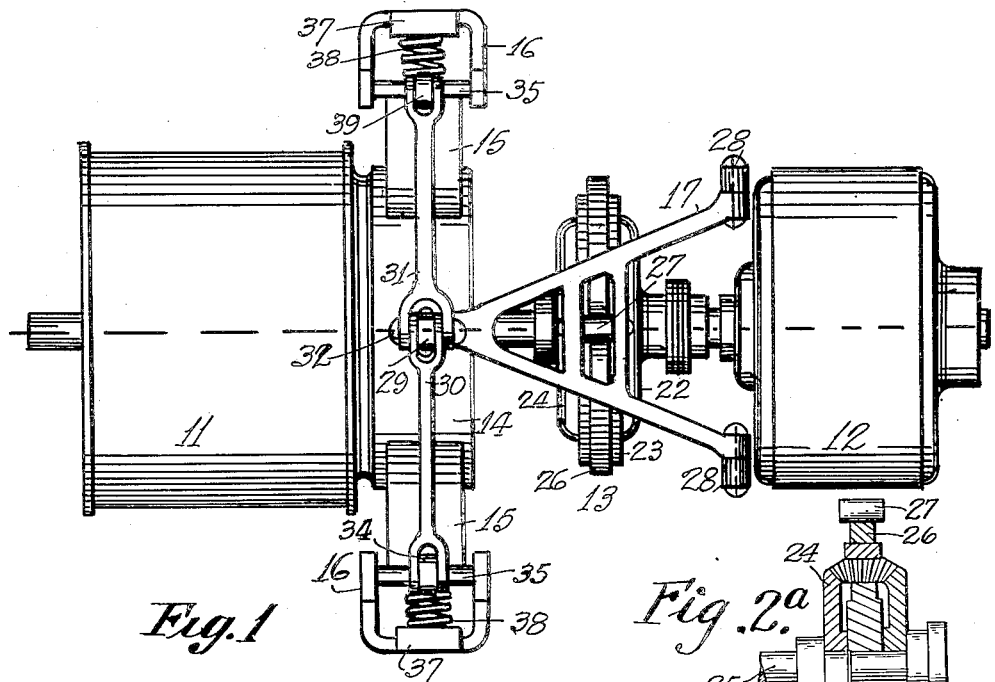

This invention relates to the type of braking mechanisms shown in U. S. Patent 1,805,551, May 19, 1931, and is a continuation in part therefrom. The present application is illustrated in connection with the braking of hoists for elevators which includes many difficult problems in braking, but the principles of the invention herein disclosed are not limited to elevator mechanisms but are of general application in braking systems.

In high speed elevators it is common practice to directly connect the operating motor with the elevator drum so that when the power to the motor is shut off, the brakes are required to stop the moving parts in a comparatively short space of time and to stop them when the mechanism is running in either direction. In the present case, the motor armature is connected with the shaft of the elevator drum through a differential mechanism, which is provided with a planetary member formed in a cam which operates to raise and lower a lever, according to the position of the cam; and this lever operates a toggle mechanism which applies or releases the brakes.

The toggle mechanism is so arranged that the forces releasing the pressure on the brake shoes are balanced against each other and comparatively little effort is necessary to apply or release the brakes. The application and the release of the brakes is controlled by the planetary member of the differential mechanism and means are provided for controlling this member in various positions to obtain the braking effects desired and, at the same time, if the current fails or the circuit of the controlling apparatus is accidentally interrupted, the brakes are automatically applied.

In the drawings, 11 is the drum of the hoist, 12 is the driving motor, 13 is the differential mechanism, 14 is the braking drum of the hoist and 15—15 are the brake shoes arranged to engage the brake drum 14. The brake shoe 15 is pivotally mounted at 36 to the lever 34 which is pivoted at 35 to the stand 16. Normally the coil spring 38, Figs. 1 and 3, seated in 37, on the stand 16, forces the brake shoe 15 into engagement with the brake drum 14. The opposite brake shoe is similarly constructed with parts correspondingly referenced and is pivotally mounted on the lever 39.

The upper end of lever 34 connects by rod 30 with the pivot 32 and the upper end of lever 39 connects by rod 31 with the pivot 32. This forms a toggle construction in which the springs 38 on opposite sides tend to apply the brakes and place a tension on rods 30 and 31. By moving the pivot 32 downwards it is apparent that lever 34 will turn on its pivot 35 and lever 39 will turn on its pivot 35 to withdraw the brake shoes from engagement with the drum; on the other hand, as the pivot 32 is raised, the tension on rods 30 and 31 is released and the springs 38 are free to bring the brake shoes into engagement with the brake drum. It will be noted that the tension on the rods 30 and 31 oppose each other and that comparatively little effort is necessary to apply or release a comparatively large braking force.

The shaft 21 of the motor 12 is connected with the bevel gear 22 and the shaft 25 of the drum connects with the bevel gear 24. These bevel gears are connected through the planetary member 23 of the differential mechanism in a well known manner and tend to cause this planetary member to rotate in either direction corresponding to the difference in speed between shafts 21 and 25. The planetary member 23 is formed on an eccentric or cam as indicated at $a$, Figs. 3 and 4, and is provided with an eccentric strap 26 which terminates in a lug 27, pivoted to the horizontal A-shaped lever 17. This lever is pivoted at 28 to a fixed part of the mechanism and the free end 29 connects to the jaws on rods 30 and 31 through the pivot 32. This has the effect of raising the pivot 32 to apply the brakes as the cam *a* of the planetary member is raised and lowers the pivot 32, releasing the brakes as the cam *a* is moved to the lower position. The brakes are thus controlled by the movement of the planetary member of the differential mechanism which is controlled by the difference in speed between the driving motor 12 and the driven drum 11.

In the operation of the mechanism above described, the motor, or driving shaft, is connected with the drum, or driven mechanism, through a lost motion connection; when this lost motion is taken up in the driving direction, the brakes are released and when it is taken up by the driven mechanism, the brakes are applied. That is, when the driven mechanism is running on its own momentum it brings the braking apparatus into operation automatically. The lost motion, in the particular form illustrated, is obtained by the limited free movement of the planetary member. The brake application is regulated by controlling the free movement of the planetary member from the position of application to the position of release of the brakes. The essential elements of this mechanism are the lost motion in the driving connection and a device responsive to this lost motion corresponding to the planetary member of the differential mechanism.

Figure 2:
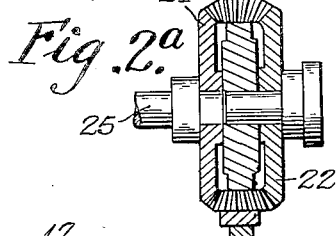
Fig. 2 is an elevation of the mechanism shown in Fig. 1.
Figure 2:
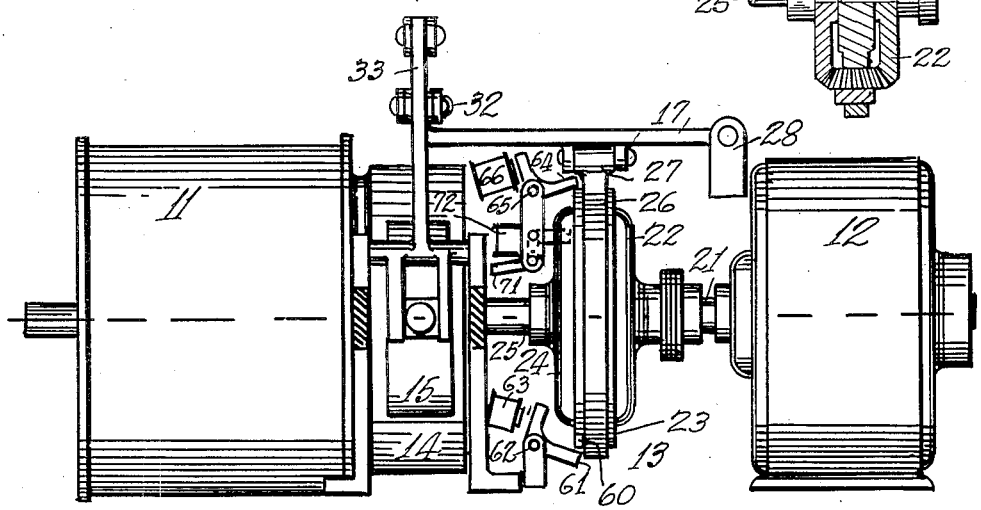

In the construction shown in Figs. 1 and 2, the planetary member having the cam for operating the brakes is mounted upon the same axis as the braking drum and the brakes are controlled by rotating the cam. This axial mounting maintains a definite relation between the operating cam and the rotating brake drum.

The arrangement in Fig. 4 is modified from that shown in Fig. 3 with the object of using the load on the cables of the hoist to supply the braking force instead of the springs 38, thus making the braking force directly proportional to the load and varying therewith. A toggle arrangement is provided, comprising the lever 50 pivoted at 51 to a fixed part of the mechanism and connected at 52 to the brake shoe, and the corresponding opposing lever 53 pivoted at 54 to a fixed part of the mechanism and connected at 55 with the brake shoe. The levers 50 and 53 are connected by the rods 42 and 43 at 44. 44 forms the pivot for pulley 45 and connects by rod 41 with the pivot 32 associated with the eccentric 26. The elevator 49 is supported by cable 46 passing over pulleys 45, 47 and 48 and it will be observed that the load on the cable tends to raise the pulley 45, thereby drawing the levers 50 and 53 together and applying the brake shoes to the drum with a force proportional to the load on cable 46. The rod 41 moves the pulley 45 downwards as the eccentric *a* is moved to the lowered position, thereby releasing the brakes. When the eccentric *a* is moved to the raised position the tension on rod 41 is released and the brakes are applied. The pivot 32 is mounted in a slot in 26 so that the tension on the rod 41 may be completely released when the brakes are applied.

The planetary member 23 has an application position and a released position and it is necessary to control the movement of this member for running conditions and for braking conditions. For this purpose a slot is provided at 60 which may be engaged by the dog 61, Fig. 5, mounted on an armature pivoted at 62 and controlled by magnet 63; the slot 60 in the planetary member may also be engaged by the dog 64 of the armature pivoted at 65 and controlled by magnet 66. The slot 60 may also be engaged by the dog 70 controlled by armature 71 of magnet 72 and it may be controlled by the dog 67, operated by armature 68 of magnet 69.

Power supply is obtained from the transformer 75 which, through wire 76, connects to motor 12 and from wire 83 connects through field coil 82 and wire 81 to the starting rheostat 79 and through controller 78 and wire 77 back to transformer 75. This operates the motor in one direction. When the controller 78 is moved to the opposite position, the circuit from wire 83 is completed through a field coil 85 and wire 84 to the starting rheostat 80, thereby driving the motor in the opposite direction.

The switch 90 moves with the controller 78 and through contacts 91—91 connects the power wire 77 with wire 92 thereby energizing the magnets 63 and 66 which connect to the return power wire 76. This raises the dog 61 to engage the slot 60 and releases the dog 64 from engagement with the planetary member. As soon as the planetary member is moved to bring the slot 60 into register with 61 the dog 61 prevents further movement of the planetary member so that it is held in position with the eccentric in the lowered position, that is, in the position in which the brakes are released, known as the running position and this condition is maintained as long as power is supplied to the motor 12.

When the power to the motor is shut off the magnets 63 and 66 are deenergized by switch 90 being moved to the neutral position. This releases the dog 61 which, by gravity, drops away from the slot 60 and leaves the planetary member free to rotate in either direction until it has made one half revolution, when the slot 60 registers with the dog 64 and is engaged by this dog and held in the braking position. This permits of the maximum braking effect and is maintained until magnets 63 and 66 are again energized by the movement of the controller when 64 is released from the slot 60 and 61 becomes effective to stop the movement of the planetary member as soon as the full released position has been reached.

The braking effect cannot be produced until the cam 23 is released by disengaging 61 from notch 60, which occurs when magnet 63, manually controlled by switch 90, is deenergized. When the braking is initiated by deenergizing magnet 63, the brakes are applied and are progressively controlled by the movement of cam 23 in either direction. The cam 23 moves in one direction by the retardation of the mechanism relative to the motor and in the opposite direction by the retardation of the motor relative to the mechanism.

It has been stated that the planetary member is moved in accordance with the difference in speed between the driving and the driven elements of the system so that if the motor ceases to run and the mechanism continues its movement the planetary member is moved at a comparatively rapid speed to the braking position. This condition may be accelerated by providing a retarding mechanism for the motor armature. This may be provided in the form of a brake and in the present instance is provided in the form of a dynamic brake which short circuits or snubs the motor and thereby retards its rotation. This is secured by the contacts 88 which are bridged by the contact member 89 on armature 65 so that when this armature is in the deenergized position and engaging slot 60 a circuit is closed from wire 76 through 88, wire 87, field coil 85, wire 83, and armature 12, to wire 76, thereby snubbing the motor and retarding its movement as the brakes are to be applied. The snubbing circuit is interrupted by the controller 90 energizing magnet 66 when starting and when running. The resistance of the snubbing circuit is determined by the type of motor used and the results desired, which are well known in the electrical arts.

When it is desired to permit the driven mechanism to run freely, without causing a brake application and without applying driving power to the motor, a circuit is provided which rotates the motor armature at idling speed and with little or no torque. This circuit is controlled by the switch 93 connecting to the power wire 77 and by wire 94, energizing field coil 95 of motor 12 and completing the circuit of the motor through the armature by wire 76. When running in the opposite direction, switch 93 connects with wire 96 and energizes the field coil 96' through the armature 12 and wire 76. The field coils 95 and 96 are designed to develop a comparatively weak magnetic field so as to cause the armature to run at a comparatively high speed with very little torque. This enables the speed of the motor to maintain the planetary member in the released position while the mechanism runs idle in either direction.

When the planetary member approaches the braking position the brakes are gradually applied through the action of the eccentric and the mechanism may be completely stopped before the dog 64 engages the slot 60, at any rate by the time that this engagement is made the planetary member is moving at a comparatively low speed. Where a braking action is desired, less than maximum braking effect, it is necessary to arrest the movement of the planetary member at some point before the dog 64 becomes effective. For this purpose, the dog 67 is provided to engage slot 60 when moving in one direction and the dog 70 is provided to engage this slot when moving in the opposite direction. These dogs are formed on an inclined plane so that they automatically disengage from slot 60 as the planetary member is driven towards the released position. This condition is obtained by the controlling switch 97 connecting with the power wire 77 and through wire 98 energizing magnets 69 and 72 which are connected by wire 76 to the transformer 75. When 69 and 72 are energized, the dogs 67 and 70 are in position to engage the slot 60 and to stop the rotation of the planetary member, thereby limiting the extent to which the brakes are applied. It will be observed that dogs 67 and 70 are moved by gravity to the released position so that if the controlling circuit on 98 is interrupted these dogs will not be effective to stop 23 and a full braking condition will obtain.

In this system it will be observed that the motor in releasing the brakes by its initial movement accelerates before taking up the load so that an alternating current motor which has a low starting torque may be used in the operation as indicated in the diagram, Fig. 5.

In the operation of this system as applied to electric elevators, it should be noted that the elevator cars are usually counterbalanced and when empty and free have a tendency to ascend. On the other hand, when the cars are loaded they have a tendency to descend, hence the braking system must be operative in both directions of running of the mechanism and preferably applied with a force proportional to the load in the cars. The brakes must operate to stop the cars upon failure of the current supply and it is desirable that the brakes be operated with as low consumption of energy as possible.

When the controllers 78 and 90 are moved to the right, the circuit of motor 12 is established through field 85 and starting resistance 80 and at the same time the magnets 63 and 66 are energized. If this is the up control the motor starts the differential mechanism and if the car is overloaded so that it requires the motor to raise it, the planetary member 23, being freed from lock 64, moves around to release the brake shoes as the motor accelerates. This offers a certain resistance to the rotation of the plentary member and in consequence the drum 11 receives an initial start before the planetary member is locked by 61 in the released position. After lock 61 becomes effective, the brakes are fully released and the motor directly drives drum 11.

If a stop is to be made when ascending with an overloaded car, the controllers 78 and 90 are moved to the central position so that the motor and the magnets 63 and 66 are deenergized. This releases the lock 61 and the direct mechanical connection between the motor shaft and the drum shaft. The drum stops rather quickly due to the ascending load while the angular momentum of the motor armature continues its rotation at a speed much greater than the corresponding speed of the hoist drum with the result that the planetary member is rotated from the released position to the braking position to stop the car.

If the motor is running slowly to raise an overloaded car, as for instance, when starting and the planetary member has been moved to the released position and it is desired to apply the brakes, the controllers 78 and 90 are placed in the central position, but as the motor armature has acquired little momentum under this condition, it will stop substantially with the rotation of the drum hoist. The drum now being free from the motor and its torque, will, by gravity, descend for a short distance until the planetary member is moved by this descending movement to the braking position to apply the brakes. There would be some tendency in this case for the descending car to drive the motor armature in the reverse direction, but the friction of the armature and the fact that it has to reverse its movement, permits the planetary member to operate to the braking position, a condition which is accelerated by the brake applying force acting through the eccentric of the planetary member.

If the ascending car is underloaded and has a tendency to ascend against gravity, as the controllers 78 and 90 are moved towards the right, the lock 64 is released and the lock 61 is positioned to stop and lock the planetary member in the running position. As the mechanism is braked at starting and until the planetary member moves to the released position, the motor will accelerate faster than the drum and bring the planetary member around to the locking position and, in this position, if the drum tends to run faster than the armature it will drive the armature, and on the other hand, if the armature tends to run faster than the drum it will drive the drum to this extent.

In the last case, if the planetary member is not locked in the released position, it will be rotated in either direction by the difference in speed between the drum and the armature and as the drum exceeds the corresponding speed of the armature, braking conditions will be established until the drum is slowed down to correspond with the armature in speed, hence by regulating the speed of the armature, the speed of the car can be regulated by the braking system when running under no load.

When a stop is made with an underloaded car, the motor armature decelerates when its circuit is opened while the drum continues its rotation. This differential in speed moves the planetary member to the application position and stops the car in the manner described. In a case of this kind the planetary member may be rotated comparatively quickly to the braking position by retarding the speed of the motor. One way of doing this is by snubbing its circuit through the contacts 88.

When it is intended to permit the mechanism to run freely without braking and without driving torque, the switch 93 is closed to energize either of the field coils 95 or 96 according to the direction of running so that the motor will maintain the planetary member in the released position with "no torque".

When it is desired to obtain a limited degree of braking the switch 97 is operated to energize the magnets 69 and 72 so as to lock the planetary member against rotation at an intermediate braking position.

When an underloaded car is ascending and it is desired to change its direction of running, it is stopped in the manner described, the controller 78 is then reversed to change the direction of running of the mechanism and as it speeds up it moves the planetary member to the running position where it is locked in the usual way.

This invention embodies certain features that are believed to be generic in braking systems. The system is normally controlled manually, but it is subject to automatic control by an open or dead circuit which will lead to a brake application without action on the part of the operator. For instance, if the motor circuit becomes dead when running the brakes will be applied in the same way as if the controller were placed in the neutral position. If the circuit to the magnets 63 or 66 is deenergized, the dog 61 releases the planetary member from the running position and permits it to move to the application position, and dog 64 holds it in the application position by gravity. If magnets 69 and 72 fail to energize, this will lead to a greater degree of braking than was intended which is a safe condition.

The closed circuit principle referred to is carried out not only with respect to the electrical apparatus, but a bias is applied also to a number of the mechanical parts leading to a braking or safe action if these parts are broken or removed. For instance, if dog 61 fails mechanically to hold the planetary member, this member will be rotated to the application position; and if dog 64 fails to hold the planetary member in the application position, the brakes will be applied throughout a cycle depending upon the shape of cam 23. If a complete stop is not obtained in this cycle, the brakes will be released to be again applied as the cycle is repeated by the rotation of the planetary member.

Tension is applied to rods 30 and 31 to hold the brakes released, it is apparent therefore that if either of these rods, or rods 34 or 39 become disconnected or broken, a braking action will result; this also applies to rod 41, Fig. 4. When these essential parts fail in their function, a supervisory control of the brakes is automatically brought into action, independently of the manual control, which leads to a condition of safety.

Another generic feature in this braking system resides in a manually operated system having a member 22 normally at rest as far as affecting the braking system is concerned but which has a free movement when the brakes are being applied to modify the braking action. The planetary member 22 is normally at rest under running conditions, relative to the rotating mechanism, but it is moved from this position of rest as the braking action takes place and controls the brake application automatically with a graduated effect according to the shape of cam 23. Thus, it produces a characteristic braking effect independent of any action by the operator other than initiating the brake action. The planetary member is moved by the difference in speed between the driven mechanism and the motor armature and, as the motor usually decelerates much faster than the mechanism at the higher speeds, this member is moved from its position of rest in accordance with the speed of the driven mechanism and hence, it controls the braking in accordance with the speed of the mechanism to be braked.

It will be noted that the starting action moves the member 22 from one position of brake control to another where it remains during running conditions, but when the brakes are to be applied this member is moved back to the starting position. The rise of the cam 23 opposes the braking force, or the brake controlling force, thus establishing a bias tending to move this member to the starting position, or the position of brake application.

The member 22 also controls the braking system electrically through contacts 88, 89, which are closed after this member has made a predetermined movement from its position of rest, provided magnet 66 is de-energized. The contacts 88, 89, snub the motor and the motor is gear connected with the driven mechanism through the cam or planetary member. Thus the snubbed motor retards the driven mechanism proportional to the retardation of the cam. If the brake action retards the driven mechanism excessively, that is locks the brake drum by the brake shoes, or tends to cause an "overbraked" condition by too sudden retardation so that the driven mechanism is reduced below the corresponding speed of the motor, the movement of the cam will thereby be reversed and it will move towards the releasing position until the overbraked condition is removed. The operation of this control mechanism is fully described in U. S. Patent 1,805,551, May 19, 1931.

This invention includes a braking system, subject to manual control in application and in release of the brakes, and subject to automatic control by the failure of essential parts of the system causing an application of the brakes. These brake applications are modified automatically by a member normally at rest when running but moved to a condition of control when braking in accordance with speed and any other desired condition.

It will be observed that the planetary member operates to apply and release the brakes when rotated in either direction and the system is thus applicable to mechanism that requires braking in both directions. It will also be noted that by reversing the motor a quick movement of the planetary member may be obtained. For instance, if the switch 90 is left open and the motor is reversed the planetary member will be quickly brought to the locking position. A sudden application of the brakes cannot be made owing to the graduated action of the eccentric through which the brakes are applied.

It should be observed that the drawings, particularly Figs. 3, 4 and 5 are diagrammatic in form and are intended to show the principles of the invention as they may be embodied in any particular type of apparatus. Where a theory is expressed herein it is in accordance with present knowledge and may be subject to modification.

The planetary member, as referred to herein, is the member of the differential mechanism which is moved by the difference in speed, or in movement of the two other members of the mechanism. It is usually the member placed between the two outer bevel gears and carrying the bevel pinions engaging these gears, as indicated in the drawings; but it is well understood that any of the three main moving members of the differential mechanism may be arranged to take up the difference in movement of the other two and thus become the planetary member for the purpose of this invention.

In U. S. Patent 1,805,551 of May 19, 1931, of which the present application is a continuation in part, the fundamentals of the differential load brake are disclosed, applied to a vehicle. In this patent the planetary member of the differential mechanism is stopped only in one position, the stop is mechanical and it is not remotely controlled, nor releasable. The stop acts to prevent rotation in one direction only of the planetary member but does not prevent rotation in the opposite direction. It is not possible with the construction of this patent to stop the change in braking effect by stopping the planetary member at an intermediate point, or by stopping the differential action by maintaining the speed of the motor. In the application the planetary member cannot over-run the braking position, as is possible, under certain conditions, with the structure of the patent.

Having thus described my invention, I claim:

1. A braking system comprising a driving mechanism, a mechanism driven by said driving mechanism, a brake for said driven mechanism, a differential mechanism having a planetary member connecting said mechanisms, means for operating said brake by said planetary member and releasable means for locking said planetary member in the braking position.

2. A braking system comprising a driving and a driven mechanism, a brake for said driven mechanism, a differential mechanism having a planetary member connecting said mechanisms, means for applying said brake by the movement of said planetary member and means for locking said planetary member against movement before the extreme braking position is reached.

3. A braking system comprising a driving and a driven mechanism, a brake for said driven mechanism, a differential mechanism having a planetary member connecting said mechanisms, means for operating said brake as said planetary member is moved in either direction and means for locking said planetary member against movement in either direction.

4. A braking system comprising a driving and a driven mechanism, a brake for said driven mechanism, a differential mechanism having a planetary member connecting said mechanisms, means for operating said brake by the movement of said planetary member and means actuated by gravity for locking said planetary member in the braking position.

5. A braking system comprising a driving and a driven mechanism, a brake for said driven mechanism, a differential mechanism having a planetary member connecting said mechanisms, means for operating said brake by the movement of said planetary member, a lock for locking said planetary member in the released position, said lock being actuated by gravity to the released position.

6. A braking system comprising a driving and a driven mechanism, a brake for said driven mechanism, a differential mechanism having a planetary member connecting said mechanisms, means for operating said brake by the movement of said planetary member, a lock for locking said planetary member in the braking position actuated by gravity and a lock for locking said planetary member in the released position, the latter lock being actuated to the released position by gravity.

7. A braking system comprising a driving and a driven mechanism, a brake for said driven mechanism, a differential mechanism having a planetary member connecting said mechanisms and having a locking notch, means for operating said brake by the movement of said planetary member and means engaging said notch for locking said planetary member against movement in one direction, said locking means being released from said notch by the movement of said planetary member in the reverse direction.

8. In a braking system, a driving motor having a first field and a circuit including a switch for controlling said field energization, a second field and a circuit including a switch for controlling said second field energization; a driven mechanism, a brake for said driven mechanism, operating means for the brake, connecting means between the driving motor and the driven mechanism comprising a differential mechanism having a planetary member, the said planetary member being rotatable in response to a difference in speed of rotation of the motor and the driven mechanism, connecting means between the planetary member and the brake effective to control the brake operating means upon rotation of said planetary member, the first named field being effective to drive the motor at a greater rate of speed than the driven mechanism to produce rotation of said planetary member, and said second named field being effective to operate the motor at substantially the same speed as the driven mechanism to substantially prevent movement of the planetary member to the braking position.

9. A braking system having a driving mechanism comprising a motor having a field coil, a mechanism driven by said driving mechanism, a differential mechanism having a planetary member connecting said mechanisms, means for operating said braking system through said planetary member by the difference in movement between said driving and driven mechanisms, means for controlling the field of said motor to operate at normal load for operating the driving mechanism and a second field coil for controlling said motor to operate below normal load to correspond with the movement of the driven mechanism and prevent a brake application.

10. A braking system comprising a driving mechanism with a driving motor, a mechanism driven by said driving mechanism, a differential mechanism having a planetary member connecting said mechanisms, means for operating said braking system by the movement of the planetary member, a circuit for snubbing said motor and means operated by said planetary member controlling said circuit.

11. A braking system comprising a driving mechanism, a mechanism driven by said driven mechanism, a brake for said driven mechanism, a differential mechanism having a planetary member connecting said mechanisms, means for operating said brake by the movement of said planetary member, means for locking said planetary member in the braking position and means for retarding the movement of said driving mechanism when braking conditions are established.

12. A braking system for a hoist comprising a driving motor, a hoisting drum with a cable and a braking drum, a differential mechanism having a planetary member connecting said motor and drum, a pair of brake shoes, each mounted on a pivoted lever, means connecting said levers with said cable for forcing said shoes into engagement with said braking drum and said planetary member operating said levers to move said shoes to the released position.

13. A braking system for a hoist comprising a driving motor, a hoisting drum with a cable and a braking drum, a differential mechanism having a planetary member connecting said motor and drum, a pair of brake shoes, each mounted on a pivoted lever, a toggle mechanism connecting said levers with said cable for forcing said shoes into engagement with said braking drum and said planetary member connected with said toggle mechanism for holding said shoes in the released position.

14. A braking system for a hoist comprising a driving motor, a hoisting drum with a cable and a braking drum, a differential mechanism having a planetary member connecting said motor and drum, a pair of brake shoes mounted to engage said braking drum and means for applying said shoes to said braking drum with a force proportional to the pull on said cable and means connecting said brake shoes with said planetary member for controlling the brake application.

15. A braking system for a hoisting drum with a cable and a braking drum, a pair of brake shoes, means connecting said shoes with said cable for forcing said shoes into engagement with said braking drum, a differential mechanism having a planetary member with a free movement for controlling the movement of said brake shoes and remotely controlled means for operating said differential mechanism to effect the movement of said planetary member.

16. A braking system for a hoisting drum with a cable and a braking drum, a pair of brake shoes, a toggle mechanism for moving said shoes to engage and release said brake drum, a differential mechanism having a planetary member operatively connected with said toggle mechanism and remotely controlled means for operating said differential mechanism.

17. A braking system for a hoisting drum with a cable, a braking drum and a brake shoe engaging said drum, means operatively connecting said cable with said shoe to apply the brakes, a differential mechanism having a planetary member with a limited movement controlling the movement of said brake shoe and remotely controlled means for operating said differential mechanism to effect movement of said planetary member.

18. A braking system comprising a driving and a driven mechanism, a brake for said driven mechanism, a differential mechanism having a planetary member with a free movement connecting said mechanisms, means for controlling said brake by said planetary member, a device for retarding the movement of said planetary member and remotely controlled means for operating said retarding device.

19. A braking system comprising a driving motor having a driving field coil and a driven mechanism, a brake for said driven mechanism, a differential mechanism having a planetary member with a free movement connecting said motor and driven mechanism, means for operating said brake by said planetary member and a second coil for producing a weaker field than said driving field coil for operating said motor.

20. A braking system comprising a driving motor and a driven mechanism, a brake for said driven mechanism, a differential mechanism having a planetary member with a free movement connecting said motor and driven mechanism, means for operating said brake by said planetary member and an independent winding on said motor for driving said motor to correspond with the speed of the driven mechanism to prevent the application of the brake.

21. A braking system comprising a driving motor having an operating circuit and a driven mechanism, a brake for said driven mechanism, a differential mechanism having a planetary member with a free movement connecting said motor and driven mechanism, means for operating said brake by said planetary member, a circuit for snubbing said motor and manually operated means controlling said motor circuit and said snubbing circuit to accelerate movement of the planetary member.

22. A braking system comprising a driving motor and a driven mechanism, a brake for said driven mechanism, a differential mechanism having a planetary member with a free movement connecting said motor and driven mechanism, means for operating said brake by said planetary member, means for locking said planetary member in a plurality of positions against movement and means for snubbing said motor.

23. A braking system comprising a driving motor and a driven mechanism, a brake for said driven mechanism, a differential mechanism having a planetary member with a free movement connecting said motor and driven mechanism, means for operating said brake by said planetary member and means controlled by said planetary member for snubbing the circuit of said motor.

24. A braking system comprising a driving motor and a driven mechanism, a brake for said driven mechanism, a differential mechanism having a planetary member with a free movement connecting said motor and driven mechanism, means for operating said brake by said planetary member, a device for retarding the movement of said planetary member and a magnet controlling said device.

25. A braking system comprising a hoisting drum connected with a braking drum, a brake for said drum, means for applying said brake to the drum, a differential mechanism with a planetary member having a free movement controlling said brake through a graduated action and an alternating current motor driving said hoisting drum through said differential mechanism.

26. In a braking system for a hoist, the combination, a hoisting drum connected with a braking drum, a brake for said braking drum, a differential mechanism with a planetary member controlling said brake and a motor operating said hoisting drum through said differential mechanism, said drums, differential mechanism and motor being arranged in axial alignment.

27. A braking system for a hoist comprising a driving motor, a hoisting drum, a brake for said drum, a hoist connected with said drum by a cable, means for applying said brake proportional to the pull on said cable, a differential mechanism having a planetary member connecting said motor with said drum and means controlling said brake by said planetary member.

28. A braking system for a hoist comprising a driving motor, a hoisting drum, a brake for said drum, a hoist connected with said drum by cable, means for applying said brake proportional to the pull on said cable, means connecting said motor with said hoisting drum and means embodied in said connection providing for a limited movement of said motor relative to said drum and means for operating said brake by said connecting means as the movement of the motor is varied relative to the movement of the drum.

29. A braking system comprising a driving mechanism and a driven mechanism, a differential mechanism having a planetary member connecting said mechanisms, said planetary member having a limited free movement to provide lost motion in the driving connection, a braking drum for said driven mechanism, a brake for said drum operatively connected with said planetary member and remotely controlled means for locking said planetary member to restrict the lost motion in the driving connection.

30. A braking system for a hoist comprising a driving motor and a driven mechanism having a braking drum and a brake engaging said drum, a cam mounted on the same axis as said drum controlling the operation of said brake as the cam is rotated, means operatively connecting said cam with said motor and means remotely controlled for locking said cam against movement.

31. A braking system comprising a driving mechanism, a mechanism driven by said driving mechanism, a brake for said driven mechanism, a differential mechanism having a planetary member connected with said mechanisms, means for operating said brake by said planetary member, said planetary member having a position for releasing the brake and another position for applying the brake and means for locking said planetary member in each position.

32. A braking system comprising a driving motor, a mechanism driven by said motor, a brake for said driven mechanism, a differential mechanism having a planetary member connected with said mechanisms, means for operating said brake by said planetary member, an electrically operated lock for controlling the movement of said planetary member and an electric controller controlling the circuit of said motor and said lock.

33. A braking system comprising a driving mechanism, a mechanism driven by said driving mechanism, a brake for said driven mechanism, a differential mechanism having a planetary member connected with said mechanism, means for operating said brake by said planetary member, a pair of electrically operated brakes for controlling the movement of said planetary member and means for making one of said brakes effective and the other ineffective at a time.

34. A braking system comprising a driving mechanism, a driven mechanism connected with said driving mechanism through a lost motion connection, means operated by said lost motion connection in accordance with the direction in which said lost motion is taken up, a brake for said driven mechanism operated by said means in one position to apply the brake and in the other position to release the brake and remotely controlled locking means restricting the movement of said means in both positions.

35. A braking system comprising a motor, a driven mechanism having a braking drum, driven by said motor, a brake for said drum, a cam mounted on the same axis as said drum, an A-shaped lever connecting said cam with said brake to cause a brake application when the cam is rotated in one direction and to release the brake when the cam is rotated in the opposite direction and means for rotating said cam.

36. A braking system comprising a motor, a mechanism driven by said motor through a lost motion connection, a braking drum on said mechanism, a brake for said drum, a lever for operating said brake, a cam mounted to rotate on the same axis as said drum, a lever engaging said cam and directly connected with said brake lever to cause a brake application when the cam is rotated in one direction and to release the brake when the cam is rotated in the opposite direction and means for automatically rotating said cam.

37. A braking system comprising a moving mechanism to be braked, driving means for said moving mechanism, means for cutting off said driving means, a brake shoe for said mechanism, a source of power for operating said brake shoe, brake operating means controlling said power for applying the brakes, a manually operated member controlling said brake operating means, a member pivoted on said mechanism and having a limited lost motion on said pivot, means for taking up the lost motion of said member after the driving means is cut off, by said moving mechanism, said pivoted member operating to control said brake operating means as the lost motion is taken up and after control by the manually operated member.

38. A braking system comprising a rotating mechanism to be braked, driving means for said mechanism, brake shoes for said mechanism, a source of power for operating said brake shoes, brake operating means controlling said power for applying the brakes, a manually operated member controlling said brake operating means, a member pivoted on said mechanism and having a limited lost motion on said pivot, means for taking up the lost motion of said member as the driving means ceases to drive, by said rotating mechanism, said pivoted member operating to control said brake operating means as the lost motion is taken up and after control by the manually operated member and electro-magnetic means controlling the operation of said pivoted member.

39. A braking system comprising a moving mechanism to be braked, driving means for said moving mechanism, brake shoes for said mechanism, a source of power for operating said brake shoes, brake operating means controlling said power for applying the brakes, a manually operated member controlling said brake operating means, a member pivoted on said mechanism and having a limited lost motion on said pivot, means for taking up the lost motion of said member as the driving means ceases to drive, by said moving mechanism, said pivoted member operating to control said brake operating means as the lost motion is taken up and after control by the manually operated member and a circuit associated with said braking system controlled by said pivoted member.

40. A braking system comprising a moving mechanism to be braked, driving means for said moving mechanism, means for cutting off said driving means, brake shoes for said mechanism, a source of power for operating said brake shoes, brake operating means controlling said power for applying the brakes, a manually operated member controlling said brake operating means, a member pivoted on said mechanism and having a limited lost motion on said pivot, means for taking up the lost motion of said member after the driving means is cut off, by said moving mechanism, said pivoted member operating to control said brake operating means to modify the brake application as the lost motion is taken up after control by said manually operated member, but independently of said manually operated member.

41. A braking system comprising a moving mechanism to be braked, brake shoes for said mechanism, a source of power for operating said brake shoes, means for applying the brakes including a manually operated member, and a movable member having a position substantially of rest when said mechanism is moving under normal conditions and means whereby said movable member changes its position by the retardation of said mechanism and in accordance with the speed of said mechanism to modify the brake application, said moving member controlling the brake application independently of said manual means after the brake application is initiated.

42. A braking system for a hoist comprising a drum, brake shoes for said drum, means for driving said drum, a source of power for operating said brake shoes, brake operating means controlling said power for applying the brakes, manually operated means controlling said brake operating means, a member pivoted on said mechanism and having a limited lost motion on said pivot, means whereby the lost motion of said pivoted member is taken up in one direction by said driving means and in the opposite direction by the movement of said drum, said pivoted member operaing to control said brake operating means to modify the brake application after control by the manually operated means.

43. A braking system comprising a moving mechanism to be braked, brake shoes for said mechanism, a source of power for operating said brake shoes, brake operating means controlling said power for applying the brakes, a manually operated member controlling said brake operating means, means for driving said moving mechanism, a member pivoted on said mechanism and having a limited lost motion on said pivot, means whereby the lost motion of said pivoted member is taken up in one direction by said driving means and in the opposite direction by said moving mechanism, said pivoted member operating to control said brake operating means to cause a progressive brake application after control by the manually operated means.

MATTHEW H. LOUGHRIDGE.